United States Patent [19]
Schroeder et al.

[11] 3,844,369
[45] Oct. 29, 1974

[54] TRACTOR GRILLE HOUSING MOUNTING

[75] Inventors: Kenneth Roger Schroeder, Holy Cross; Lyle Eugene Miller, Dubuque, both of Iowa

[73] Assignee: Deere & Company, Moline, Ill.

[22] Filed: Sept. 27, 1972

[21] Appl. No.: 292,549

[52] U.S. Cl.............................. 180/68 P, 172/801
[51] Int. Cl.............................................. B60k 11/04
[58] Field of Search............... 180/68 P, 68 R, 69 R; 172/801, 809

[56] References Cited
UNITED STATES PATENTS

| | | | |
|---|---|---|---|
| 2,468,809 | 5/1949 | Brock et al. | 180/69 R |
| 2,921,392 | 1/1960 | Bidwell | 172/809 |
| 2,962,107 | 11/1960 | Mihal et al. | 180/69 R X |
| 2,965,187 | 12/1960 | Zeman | 180/69 R |

*Primary Examiner*—Kenneth H. Betts
*Assistant Examiner*—David M. Mitchell

[57] ABSTRACT

A grille housing forms the forward end of a tractor and is connected to the tractor frame by fastener means which are arranged such that by removing some and loosening others the grille housing can in one arrangement be pivoted a slight amount to provide access to a fan and radiator assembly normally housed by the grille housing and which in another arrangement will permit the grille housing to be rotated forwardly until the entire fan and radiator assembly is exposed.

3 Claims, 2 Drawing Figures

PATENTED OCT 29 1974 3,844,369

TRACTOR GRILLE HOUSING MOUNTING

BACKGROUND OF THE INVENTION

The present invention relates to a grille housing for a tractor and more particularly relates to a housing which is connected so as to be selectively pivotable to an operative position which exposes the components normally housed thereby for servicing and repair.

In use today are many large industrial tractors, or the like, which have such things as the fan, radiator, oil cooler, hydraulic lines, and water pump located on one end of the tractor frame adjacent the engine of the tractor. Surrounding these components at the end of the tractor is a massive grille housing which is several hundred pounds in weight. In order to service the components located within the houding, it is sometimes necessary to remove the housing.

In the past, such removal of the housing has either been impossible or at least dangerous for one man to accomplish and/or has requried the use of auxiliary equipment such as a chain hoist or the like.

SUMMARY OF THE INVENTION

It is the principal object of the present invention to overcome the above-mentioned difficulties in the prior art by providing an improved fastener arrangement for releasably retaining a grille housing in an operative position wherein it surrounds various components located at an end of the tractor, the fastener arrangement permitting the grille housing to be moved by only one man to inoperative positions permitting access to the normally housed components. More specifically, it is an object of the invention to provide opposite pairs of bolts extending in axial alignment from the opposite sides of the grille housing, the bolts being arranged such that by removing all but one pair of bolts and by loosening that pair, the grille housing can be pivoted to a position wherein all of the components will be housed by the grille housing are exposed; and by selecting a different combination of pairs of bolts two of the pairs may be loosened while removing the remaining bolts to permit the grille housing to be pivoted a small distance for permitting access to only some of the components housed by the housing.

A further object is to provide the grille housing in combination with a tractor having a forwardly extending dozer blade assembly, the assembly being raisable to a position whereat the dozer blade is located adjacent to the grille housing whereby when the grille housing is readied for pivoting to provide access to all of the components housed therein, it will rest against the blade thus enabling it to be further lowered by actuating the power means for raising and lowering the blade.

These and other objects will become apparent from the following description and appended drawing.

DESCRIPTION OF THE PREFERRED EMBODIMENT

Figure 2:
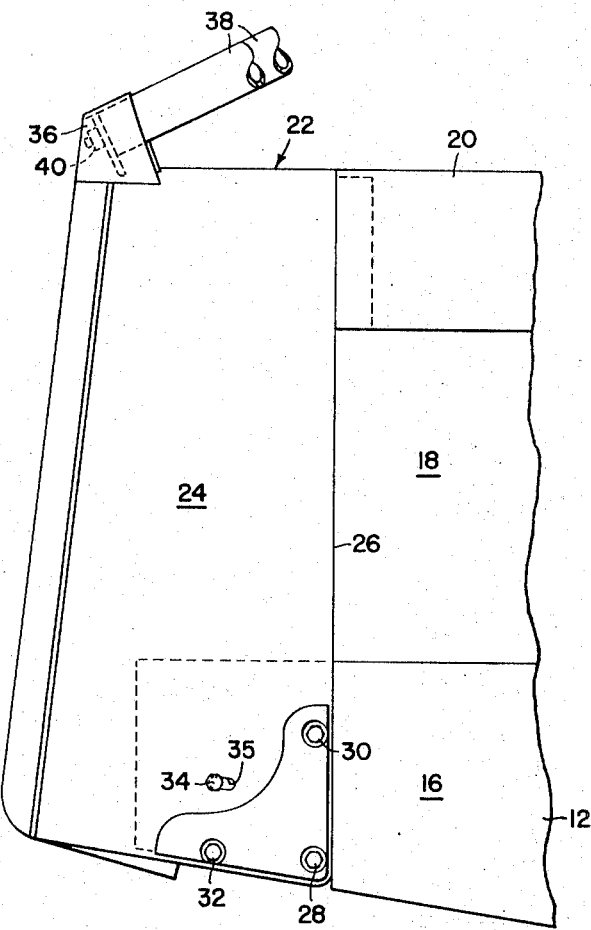
FIG. 2 is an enlarged side view showing the front end portion of the tractor shown in FIG. 1 with the grille housing being attached thereto according to the principles of the present invention.

Referring now to the drawing, there is shown the forward end portion of a tractor indicated in its entirety by the reference numeral 10. The tractor front end portion shown here is that of a skidder tractor; however, it should be apparent from the following description that the present invention is not limited to use with such a tractor. Also, it is to be noted that in the description below certain members may be referred to as existing in pairs with only one of the pairs being shown in the drawing, it being understood that the other member is either a duplicate or a mirror image of the one described with the uses of the member being the same.

The tractor front end portion 10 includes a main fore-and-aft extending frame 12 supported on a pair of ground wheels 14. Supported on the main frame 12 is a tractor engine (not shown) located within an engine housing defined by vertically extending spaced side portions 16 of the frame 12, by opposite side panels 18 and by a hood 20. The engine compartment is spaced rearwardly from the forward end of the vehicle and supported by the frame 12 at the forward end of the vehicle are such components as the fan, radiator, oil cooler and hydraulic lines, none of these components being shown. Surrounding these components and having the forward ends of the frame side portions 16 received therein is a tubular grille housing 22 having opposite upright sides 24 in face-to-face engagement with the outer surfaces of the frame portions 16 and having a rear vertical end portion 26 which is in abutment with vertical shoulders formed on the hood 20 and the frame side portions 16. The housing 22 is held in place by a plurality of stud bolts which extend transversely through holes provided in the opposite sides 24 of the grille housing and are threadly received in threaded holes provided in the frame side portions 16. Four pairs of these bolts are located in the lower rear corner portions of the grille housing sides 24 with a first pair 28 being located in the lower rear corner, a second pair 30 being located vertically above the pair 28, a third pair 32 being spaced generally horizontally forwardly of the pair 28 and with a fourth pair 34 being located substantially vertically above the pair 32. For a purpose to be explained below, that pair of openings, indicated at 35, in the opposite sides of the grille housing through which the pair of bolts 34 pass are elongated arcuately on a radius extending from the center of the pair of bolts 32 and are located substantially vertically below the center of gravity of the grille housing. Secured to the top front of the grille housing are a pair of laterally spaced sockets 36 in which are received the forward ends 38 of a pair of guard members which extend upwardly to the cab of the tractor in a manner well known in the art. The guard members 38 are respectively held in the sockets 36 by means of screws 40. The pair of bolts 28 are placed so as to provide a pivot axis about which the grille housing 22 may be rotated forwardly to expose all of the components exclosed thereby. Specifically, when all the bolts holding the housing 22 in place are removed except for the bolts 28 and the bolts 28 are loosened, the housing 22 may be pivoted forwardly about the axis defined by the bolts without interfering with any of the components housed therewithin. Thus, it is evident that if one wishes to gain access to the components within the housing 22, he may quickly do so.

Figure 1:
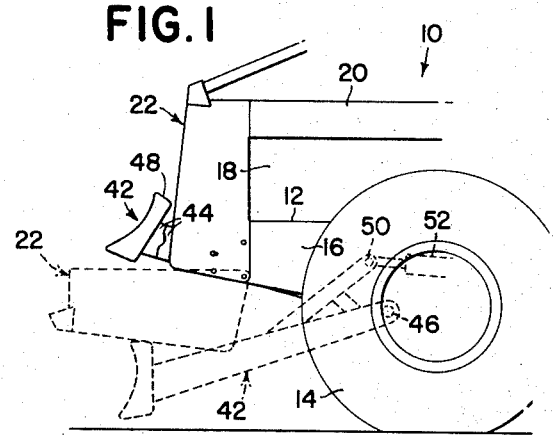
FIG. 1 is a side view of a tractor front end portion showing a dozer blade attached thereto and showing the raised position of the blade in solid lines and showing the lowered position of the blade and grille housing in dashed lines.

The tractor illustrated in FIG. 1 has a dozer assembly 42 secured to the front thereof. The dozer assembly 42 includes a pair of laterally spaced push arms 44 respectively located at the opposite sides of the frame 12 and having their rearward ends pivotally secured thereto by means of a pair of pivot pins 46 establishing an axis about which the arms are vertically swingable, the forward ends of the push arms being interconnected by means of a transversely extending blade member 48. The push arms 44 respectively have upwardly extending members 50 located at the rear ends thereof, the members 50 being connected to respective hydraulic actuators 52 which are selectively actuatable to raise and lower the dozer assembly 42 in a manner well known in the art.

When it is desired to swing the grille housing 22 forwardly in the manner described above, the operator can accomplish this swinging movement by himself by first placing the blade assembly in its upper position as shown in solid lines in FIG. 1 wherein the blade mamber 48 is disposed adjacent to the forward end of the grille housing 22. Thereafter, he may swing the grille housing forwardly until it rest upon the blade structure 48 whereupon the hydraulic actuators can be actuated to lower the grille housing to the position indicated in dashed lines in FIG. 2.

It is to be understood that when the grille housing is mounted on tractors not having blade assemblies secured thereto, auxiliary means such as a chain hoist may be used to raise and lower the grille housing about its pivot axis. In any event, it is thus appreciated that the grille housing need not be completely disconnected from the tractor frame 12 thus making it easier to reinstall the removed bolts once the grille housing is returned to its operative position. In other words, the bolts 28 act to guide the grille housing to positions whereat the holes will be aligned for insertion of the other bolts.

Should it be desired to only perform minor repairs on components located within the rear portion of the housing 22 or at the forward end of the engine, the grille housing may be rotated approximately 15° forwardly by removing all of the bolts securing the housing in place except for the two pairs of bolts 32 and 34 and by loosening the latter pairs of bolts. The arcuate openings 35 then permit the grille housing to pivot forwardly about the axis defined by the pair of bolts 32.

It is to be understood that for some arrangements of components within the grille housing 22, clearances may be such that only two pairs of bolts, such as 32 and 34, are necessary for respectively conditioning the grille housing for limited or full forward pivoting. Specifically, all but the two pairs of bolts would be removed and the two pairs would be loosened for permitting limited pivoting of the housing while the pair of bolts received in the slot would also be removed to permit full pivoting of the housing.

The foregoing description is thought to make the operation of the invention clear and, for the sake of brevity, no further description is given. It is to be noted, however, that while the grille housing is disclosed herein as at the forward end of a tractor having a forwardly mounted engine, the principles of the invention apply equally well to rear mounted engines.

We claim:

1. In the combination of a tractor of the type including a lower fore-and-aft extending main frame supporting a radiator and fan assembly at one end thereof and including opposite generally planar upright side surfaces, a massive grille housing extending around the radiator and fan assembly and having opposite sides respectively detachably secured to the opposite upright sides of the main frame, the improvement comprising: said grille housing being detachably secured to said main frame by removable fastener means including first, second and third pairs of axially aligned bolts respectively inserted through aligned apertures in the oppsite upright frame surfaces and grille housing sides; the apertures in the grille housing sides which receive said third pair of bolts being located above and curved arcuately about the axis defined by the second pair of bolts whereby said grille housing may be pivoted about the axis defined by the first pair of bolts when the first pair of bolts are the only fasteners connecting the grille housing to the main frame, and said grille housing may be pivoted about the axis defined by the second pair of bolts within the limits permitted by the arcuate apertures receiving said third pair of bolts when the second and third pairs of bolts are the only fasteners securing the grille housing to the main frame.

2. In the combination of a tractor of the type including a fore-and-aft extending main frame, a massive grille housing detachably secured, through means of a plurality of removable fasteners, to one end of the main frame for enclosing a fan and radiator assembly, the grille housing including a top from which depends opposite generally upright sides having lower portions respectively disposed adjacent opposite sides of the main frame and an engine-enclosing structure supported on the main frame in substantially aligned end-to-end relationship to the grille housing and including a fore-and-aft extending hood forming the top thereof and having opposite generally upright side panels, the improvement comprising: a first connection means, including a first pair of bolts comprising part of said removable fasteners and being removably received in a first set of axially aligned horizontally disposed apertures in the lower portions of the opposite sides of the grille housing and in the opposite sides of the main frame to thus join the respective lower portions of the sides of the grille housing to the main frame for pivotal movement about a first horizontal axis in a direction away from the engine-enclosing structure; and a second connection means, including a second pair of bolts comprising part of said removable fasteners; said second connection means further comprising a second set of aligned apertures in the lower portions of the opposite sides of the grille housing and in the opposite sides of the main frame at respective locations spaced substantially vertically above said first horizontal pivot axis and those apertures of the second set which are located in the grille housing being arcuately elongated about the first horizontal pivot axis through an angle of about 15°, and said first and second connection means cooperating when used as the sole means joining the grille housing to the main frame for establishing a connection whereby the grille housing may be selectively rotated about 15° in a direction away from the engine-enclosing structure for exposing at least a portion of the fan and radiator assembly.

3. The combination defined in claim 2 and further including a third connection means, including a third set of said removable fasteners, joining respective lower portions of the side of the grille housing to the main frame such as to define a second horizontal pivot axis, located adjacent the bottom of the grille housing near that end which is adjacent said engine-enclosing structure, about which the grille housing is pivotable in a direction away from the engine-enclosing structure through an angle of about 90° for exposing the entire fan and radiator assembly.

* * * * *